(12) United States Patent
Kawahata et al.

(10) Patent No.: US 7,023,802 B2
(45) Date of Patent: Apr. 4, 2006

(54) NETWORK SYSTEM PRIORITY CONTROL METHOD

(75) Inventors: Satoshi Kawahata, Tokyo (JP); Kuniko Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 09/736,948

(22) Filed: Dec. 14, 2000

(65) Prior Publication Data
US 2001/0014095 A1 Aug. 16, 2001

(30) Foreign Application Priority Data
Feb. 14, 2000 (JP) .............................. 2000-035017

(51) Int. Cl.
*H04L 12/66* (2006.01)
(52) U.S. Cl. ...................... 370/235; 370/352; 370/463
(58) Field of Classification Search ........ 370/352–356, 370/236, 235, 229, 230, 469, 463, 419, 420, 370/401, 400, 395.2, 395.21, 395.42, 395.43, 370/395.5, 395.52; 379/45
See application file for complete search history.

(56) References Cited

U.S. PATENT DOCUMENTS

| | | | | |
|---|---|---|---|---|
| 5,864,755 A | * | 1/1999 | King et al. ............... | 455/404.1 |
| 6,028,915 A | * | 2/2000 | McNevin ..................... | 379/49 |
| 6,067,457 A | * | 5/2000 | Erickson et al. ............ | 455/512 |
| 6,104,700 A | * | 8/2000 | Haddock et al. ............ | 370/235 |
| 6,292,489 B1 | * | 9/2001 | Fukushima et al. ......... | 370/401 |
| 6,449,251 B1 | * | 9/2002 | Awadallah et al. ......... | 370/229 |
| 6,529,499 B1 | * | 3/2003 | Doshi et al. ................ | 370/352 |
| 6,608,832 B1 | * | 8/2003 | Forslow ...................... | 370/353 |
| 6,643,258 B1 | * | 11/2003 | Ise et al. ..................... | 370/230 |
| 6,735,175 B1 | * | 5/2004 | Havens ....................... | 370/236 |
| 6,738,371 B1 | * | 5/2004 | Ayres ......................... | 370/352 |
| 6,738,824 B1 | * | 5/2004 | Blair .......................... | 709/238 |
| 2002/0097675 A1 | * | 7/2002 | Fowler et al. .............. | 370/230 |
| 2003/0039210 A1 | * | 2/2003 | Jin et al. .................... | 370/229 |

FOREIGN PATENT DOCUMENTS

JP 11-4310 1/1999

* cited by examiner

*Primary Examiner*—Dang Ton
*Assistant Examiner*—Robert C. Scheibel, Jr.
(74) *Attorney, Agent, or Firm*—Katten Muchin Rosenman LLP

(57) ABSTRACT

A network system comprises an exchange for accommodating a plurality of terminals, an IP network and a connecting device. When any one of the terminals sets a call through the IP network, the exchange notifies the connecting device of a priority class corresponding to the terminal. The connecting device saves a service type corresponding to the notified priority class. The connecting device, when it transmits packets comprising data from the terminal after the call is set, sets the saved service type to the packets. Thereby, the priority control according to the set service type is performed in the IP network.

9 Claims, 16 Drawing Sheets

NETWORK SYSTEM PRIORITY CONTROL METHOD

BACKGROUND OF THE INVENTION

1. Field of the Invention

The present invention relates to a network system priority control method for implementing voice communication through an IP (internet protocol) network.

2. Description of the Related Art

In recent years, a voice network and a data network have been consolidated rapidly with the development of a network technology. Examples of the consolidated networks include a VoIP (Voice over IP) network for relaying a telephone network through an IP network.

In order to implement QoS (Quality of Service) required by a user, conventionally, a service has been provided in accordance with a priority required by the user. More specifically, priority control for transferring a packet in accordance with a priority has been carried out. For example, in the case in which a congestion is generated in the IP network, a loss of a packet and a delay are caused so that quality of a voice is deteriorated. For this reason, congestion control is carried out in the IP network. At this time, the congestion control is executed in accordance with a priority as one of the priority control operations. In other words, the order of packet transmission is changed in accordance with the priority or a packet having a low priority is discarded. Moreover, the transmission of a packet having a low priority to the IP network is suppressed. By such priority control, stable communication quality is provided to a user who requires a high priority (requires high voice quality).

FIG. 20 is a diagram showing an example of a conventional VoIP system. As shown in FIG. 20, in the VoIP system, an exchange 6 accommodating a plurality of extension terminals (an extension A and an extension B in FIG. 20) is connected to an IP network 5 through an IP network connecting device 1 and an IP network connecting device 2 accommodating a plurality of extension terminals (an extension C and an extension D in FIG. 20) is connected to the IP network 5, for example.

In order to control the priority control in the VoIP system, the IP network connecting devices 1 and 2 are to transmit a voice packet including header information indicative of a priority to the router 3 or 4 such that a router in the IP network 5 such as a router 3 or 4 can transmit a packet in accordance with a priority when the congestion is generated. Since the IP network connecting device 2 shown in FIG. 20 directly accommodates the extensions C and D, it can transmit a voice packet (see a packet P1 in FIG. 20) having a priority set to each of the extensions C and D can be transmitted to the router 4.

However, in the case in which the exchange 6 is connected to the IP network connecting device such as the IP network connecting device 1, the IP network connecting device 1 treats the exchange 6 as one extension terminal and does not recognize the extension terminals A and B accommodated in the exchange 6. For this reason, the IP network connecting device 1 transmits, to the router, a voice packet having a priority of the exchange 6 set, (see a packet P2 in FIG. 20). In the conventional art, accordingly, only one priority can be set to each extension terminal accommodated in an exchange. In other words, in the conventional art, a priority cannot be set to each extension terminal accommodated in the exchange. Consequently, only a low priority can be set to an extension terminal to which a high priority should have been set, so that proper communication quality cannot be provided.

SUMMARY OF THE INVENTION

It is an object of the present invention to provide a network system priority control method capable of executing congestion control in an IP network in accordance with a priority set to each extension terminal accommodated in an exchange, thereby providing communication quality depending on the priority.

In order to achieve the above-mentioned object, the present invention has the following structure. More specifically, the present invention provides a priority control method for a network system comprising an exchange for accommodating a plurality of terminals and a connecting device for connecting the exchange and an IP network, wherein the exchange holds priority classes corresponding to each of the terminals;

the connecting device holds service types corresponding to each of the priority classes held in the exchange;

the exchange, when a call which any one of the terminals becomes a call-out terminal is set through the IP network, notifies the connecting device of a priority class corresponding to the first terminal as the call-out terminal;

the connecting device reads out a service type corresponding to the notified priority class, saves the read out service type; and the connecting device, when transmits packets comprising data from the terminal as the call-out terminal to the IP network after the call is established, sets the saved service type to the packets, thereby, priority control according to the service type set to the packets is performed in the IP network.

DESCRIPTION OF THE PREFERRED EMBODIMENTS

Preferred embodiments of the present invention will be described below with reference to the drawings.

(Structure of VoIP System)

Figure 1:
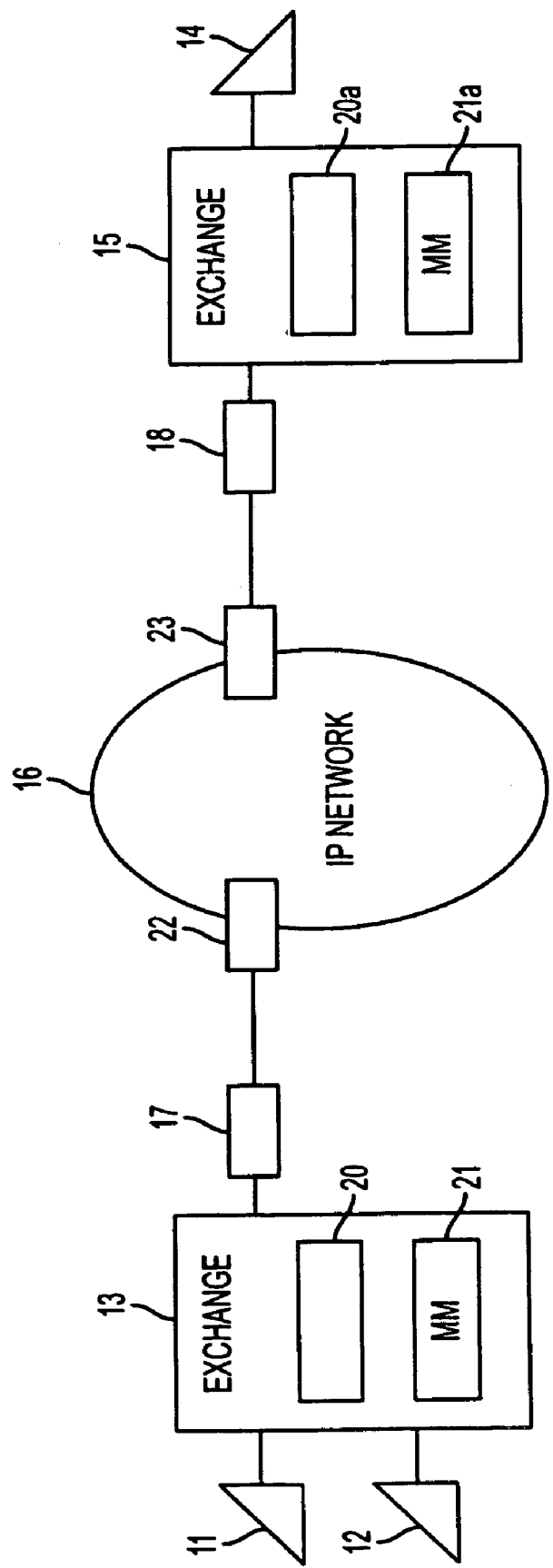
FIG. 1 is a diagram showing the structure of a VoIP network system according to an embodiment.

FIG. 1 is a diagram showing the structure of an example of a VoIP system according to an embodiment of the present invention. In FIG. 1, the VoIP system comprises an exchange 13 accommodating an extension terminal 11 (extension A1) and an extension terminal 12 (extension B1), an exchange 15 accommodating an extension terminal 14 (extension C1), an IP network connecting device 17 for connecting the exchange 13 and a router 22 included in an IP network 16 (which will be hereinafter referred to as a "connecting device"), and a connecting device 18 for connecting the exchange 15 and a router 23 included in the IP network 16.

Each of the extension terminals 11, 12 and 14 is a telephone set, a facsimile device, a personal computer, a workstation, or a mobile computer. Each of the exchanges 13 and 15 is a PBX (Private Branch Exchange) which is one of circuit switchers. Each of the exchanges 13 and 15 includes a central controlling unit 20 (20a) and a main memory (MM) 21 (21a). Each of the connecting devices 17 and 18 carries out a protocol conversion processing for connecting a line switching network (telephone network) and the IP network 16. In other words, the connecting device 17 functions as a gateway with the line switching network and the IP network. The IP network 16 is the Internet, an intranet or an extranet, for example. In this example, the IP network 16 is the Internet. The number of the extension terminals to be connected to the exchange 13 may be two or more.

(Structure of Exchange)

Figure 2:
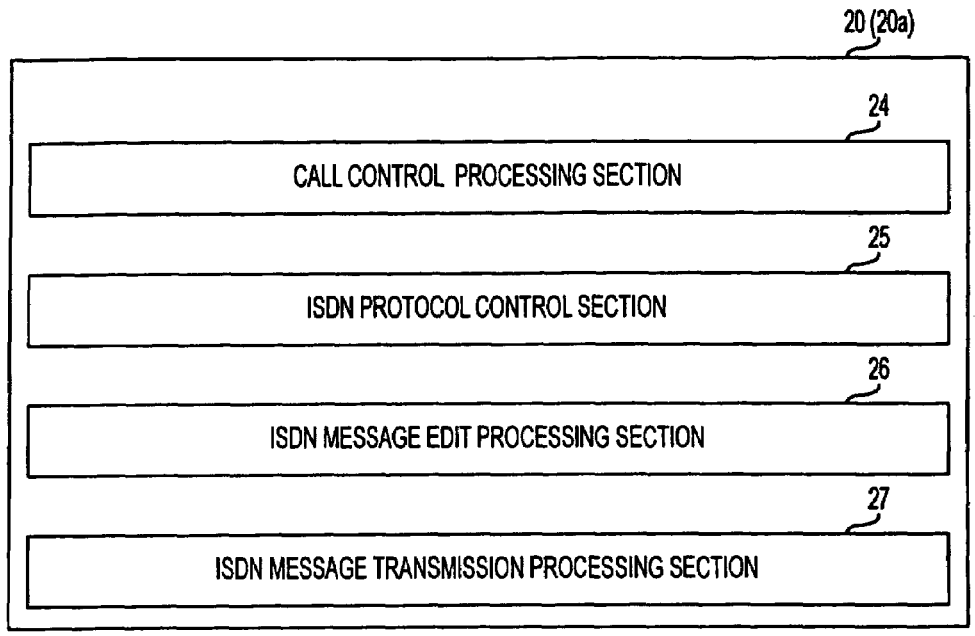
FIG. 2 is a functional block diagram showing a central controlling unit illustrated in FIG. 1.

Next, the structure of each of the exchanges 13 and 15 will be described. Since each of the exchangers 13 and 15 has the same structure, the exchange 13 will be taken as an example for the description. FIG. 2 is a functional block diagram showing the central controlling unit 20 illustrated in FIG. 1. The central controlling unit 20 is constituted by using a central processing unit (CPU), for example. The central controlling unit 20 loads various control programs into the MM 21 and executes them. Consequently, the central controlling unit 20 implements a call control processing section 24 (which will be hereinafter referred to as a "call control section 24") an ISDN (Integrated Service Digital Network) protocol control section 25 (which will be hereinafter referred to as a "protocol control section 25"), an ISDN message edit processing section 26 (which will be hereinafter referred to as an "edit section 26"), and an ISDN message transmission processing section 27 which will be hereinafter referred to as a "transmitting section 27") as shown in FIG. 2. The call control section 24 serves to carry out a general call control processing for the exchange 13.

For example, the call control section 24 serves to carry out a processing related to the case in which a call is connected to an extension terminal accommodated in another exchange (for example, the exchange 15). The protocol control section 25 is linked to the call control section 24 to execute a protocol related to the ISDN. The edit section 26 edits a message for controlling a call in accordance with an instruction of the protocol control section 25. The transmission section 27 serves to transmit and receive an ISDN message.

Figure 3:
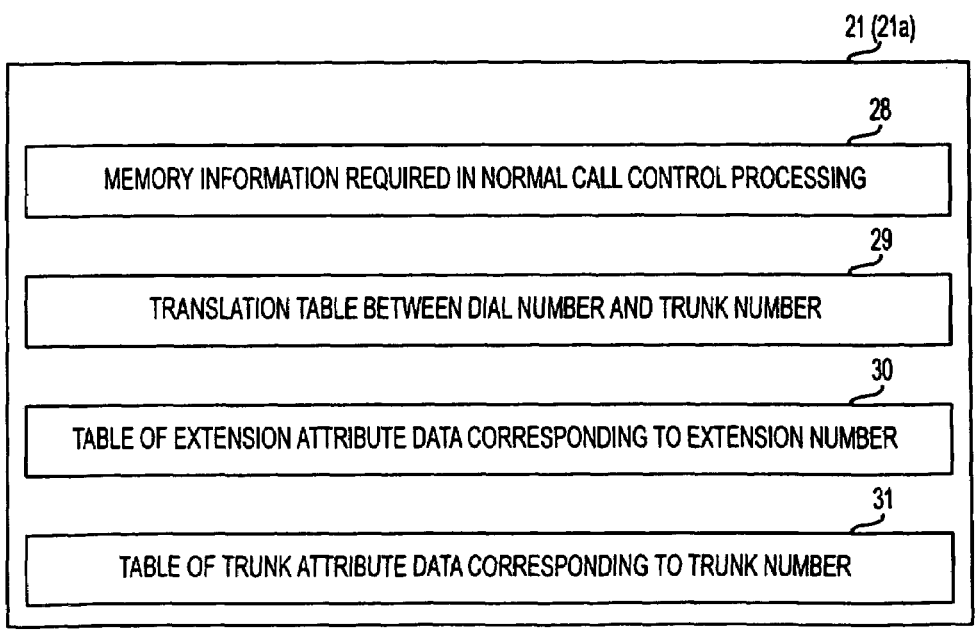
FIG. 3 is a diagram illustrating main memory illustrated in FIG. 1.

FIG. 3 is a diagram showing information held in the MM 21 illustrated in FIG. 1. As shown in FIG. 3, the MM 21 holds memory information 28 required for a normal call control processing, a translation table 29 for a dial number and a trunk number, a table 30 for extension attribute data corresponding to an extension number, and a table 31 for trunk attribute data corresponding to a trunk number.

Figure 4:
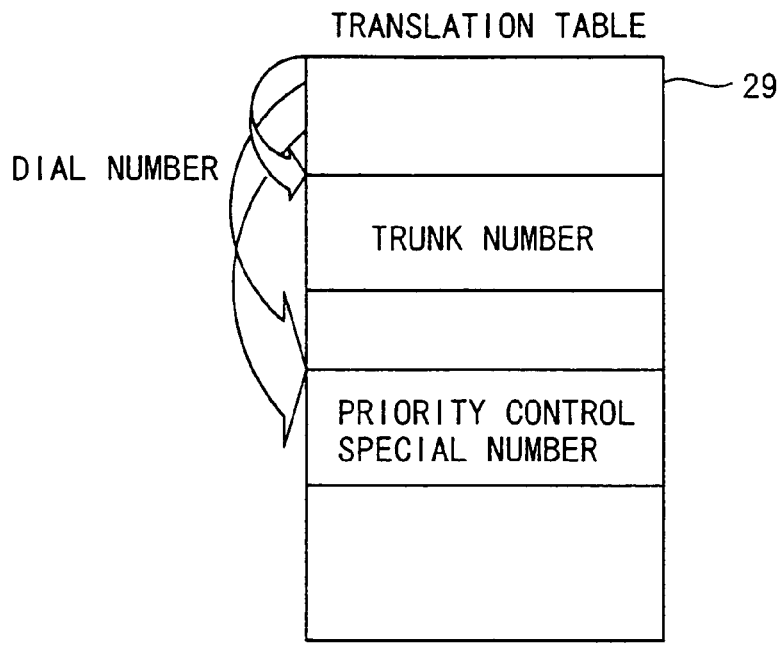
FIG. 4 is a diagram illustrating a dial number—a trunk number translation table shown in FIG. 3.

FIG. 4 is a diagram illustrating a translation table 29 illustrated in FIG. 3. As shown in FIG. 4, the translation table 29 holds a trunk number corresponding to a dial number or a priority control special number.

Figure 5:
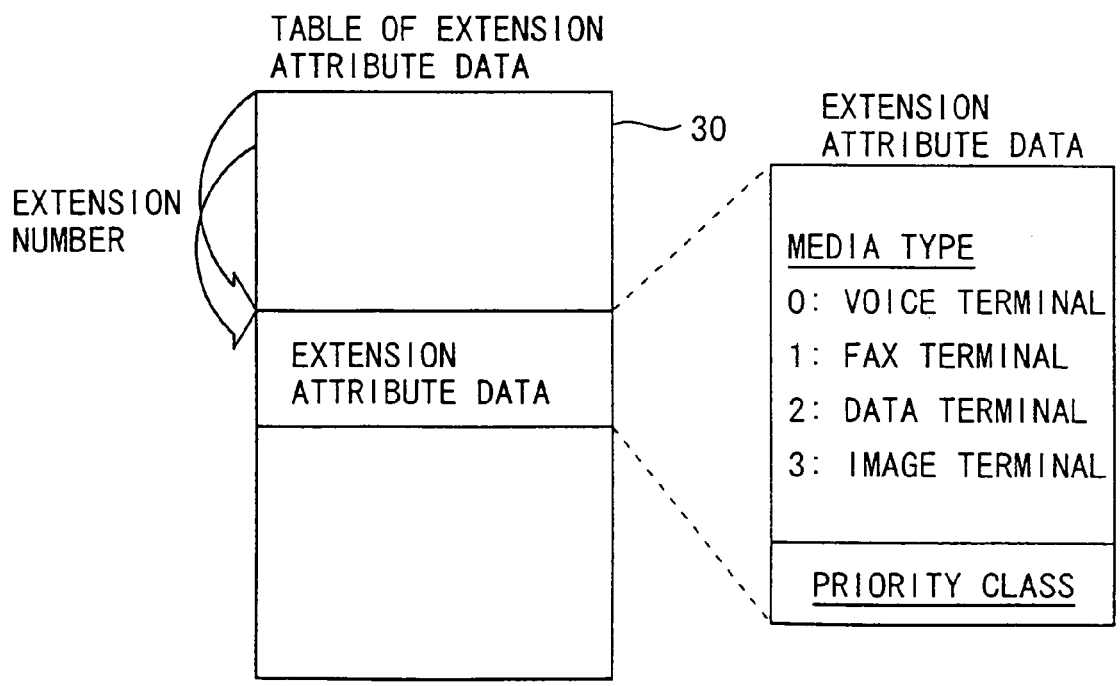
FIG. 5 is a diagram showing an extension number corresponding extension attribute data table illustrated in FIG. 3.

FIG. 5 is a diagram illustrating a table 30 shown in FIG. 3. The table 30 holds extension attribute data corresponding to an extension number. The extension attribute data include a media type of an extension and a priority class corresponding to the media type. The media type comprises a "voice terminal", a "FAX terminal", a "data terminal" and an "image terminal".

Figure 6:
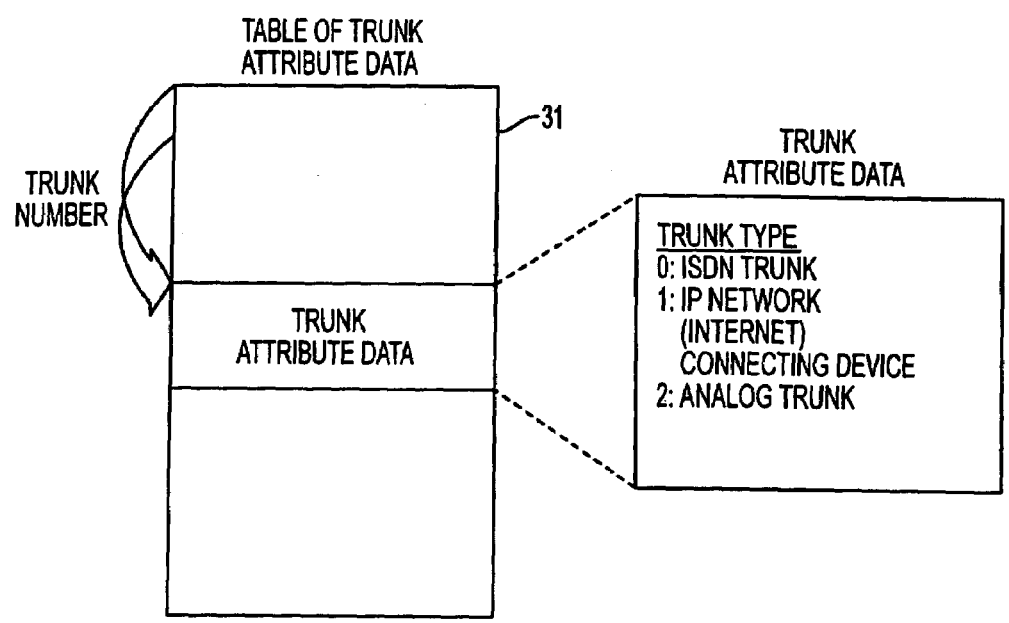
FIG. 6 is a diagram illustrating a trunk number corresponding trunk attribute data table shown in FIG. 3.

FIG. 6 is a diagram illustrating a table 31 shown in FIG. 3. The table 31 holds trunk attribute data corresponding to a trunk number. The trunk attribute data include a trunk kind. The trunk kind includes an "ISDN trunk", an "IP network connecting device" and an "analog trunk".

Figure 7:
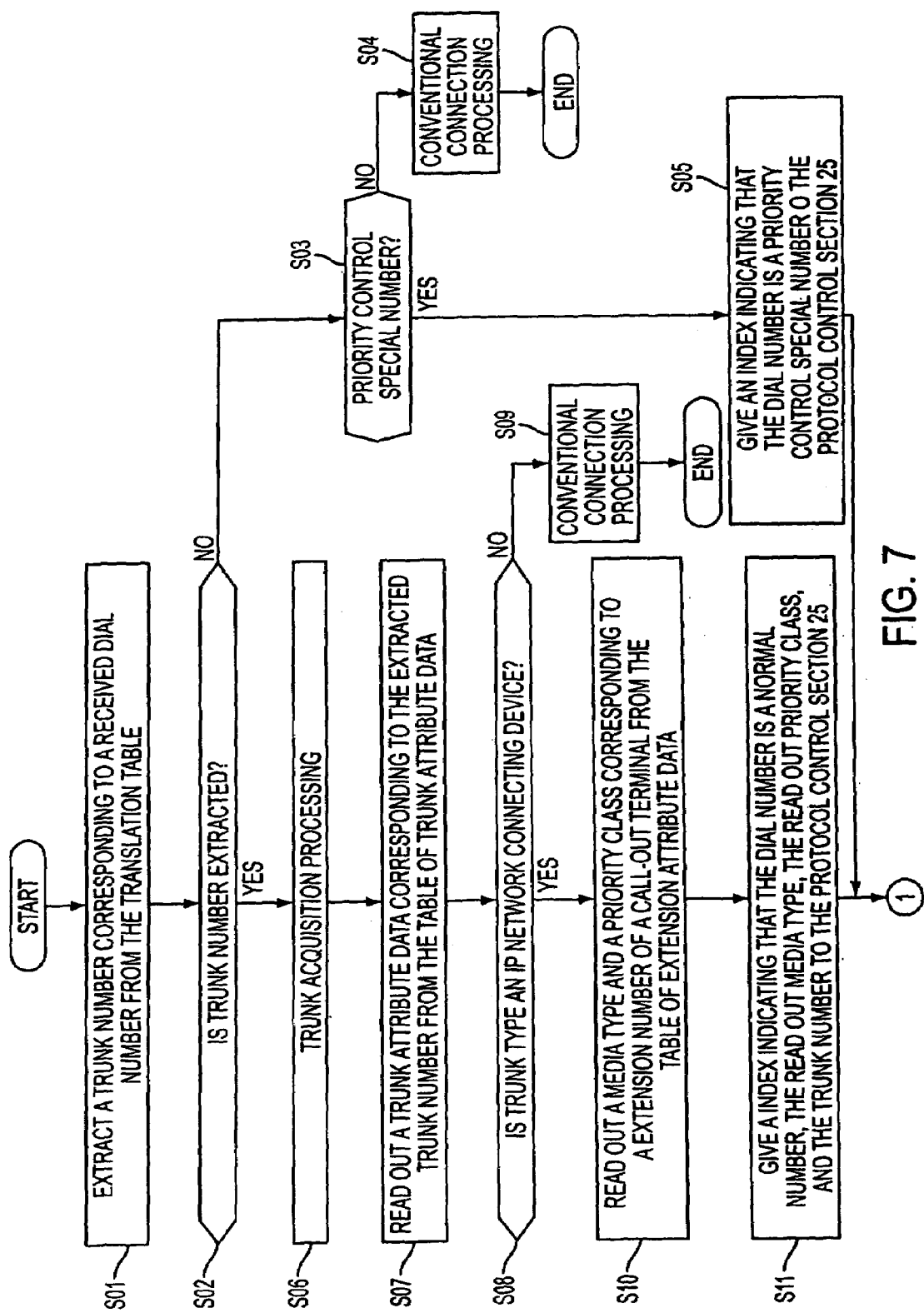
FIG. 7 is a flow chart showing a processing to be executed by an exchange illustrated in FIG. 1.
Figure 8:
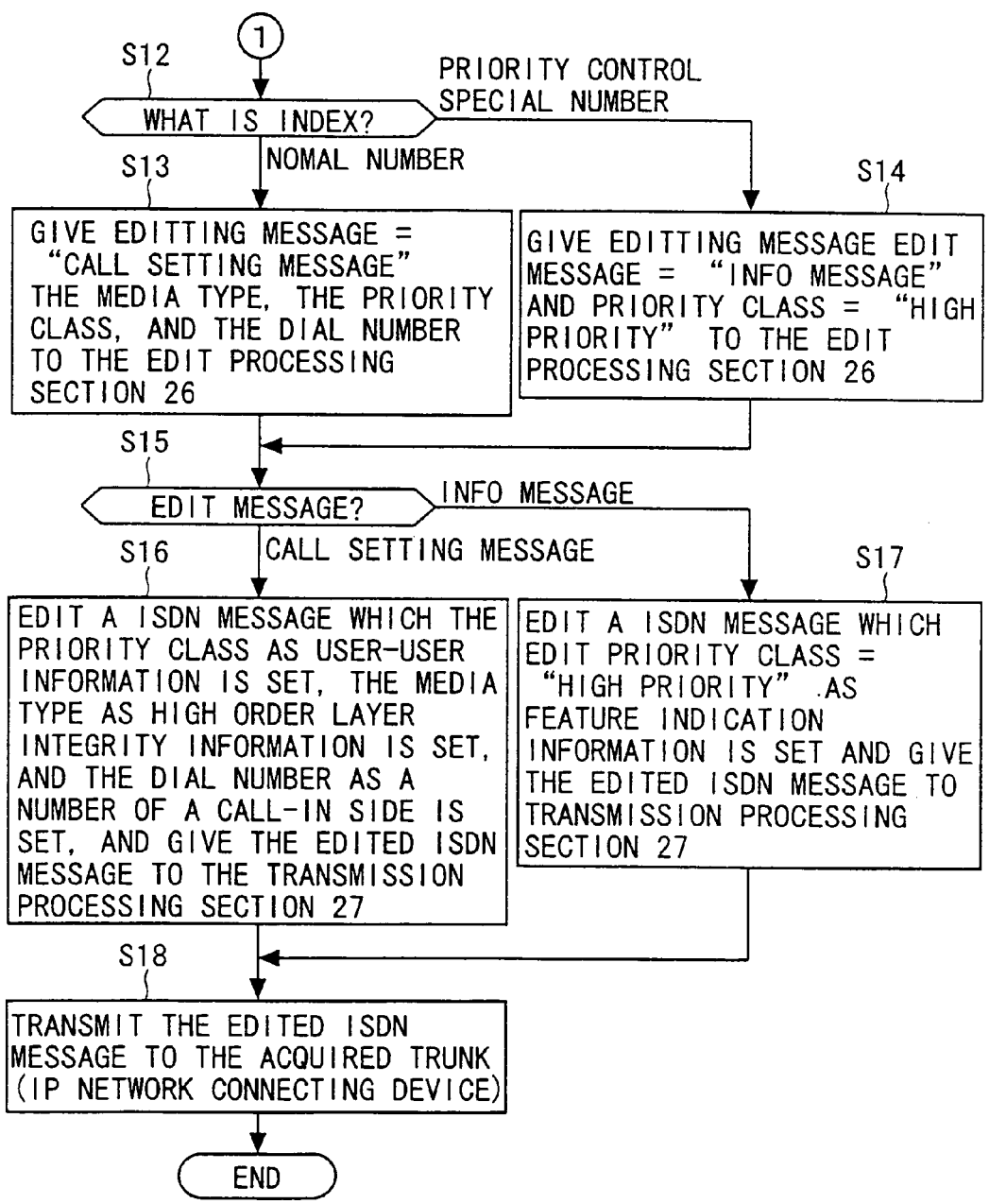
FIG. 8 is a flow chart showing the processing to be executed by the exchange illustrated in FIG. 1.

FIGS. 7 and 8 are flow charts indicative of a processing in the exchange 13. In FIG. 7, the processing in the exchange 13 is started when the exchange 13 receives a dial number of a terminal (extension terminal 14) from a call-out terminal (extension terminal 11 or 12).

First of all, the call control section 24 shown in FIG. 2 indexes the translation table 29 shown in FIG. 4 with the received dial number, and extracts a trunk number corresponding to the dial number (step S01).

Next, the call control section 24 decides whether or not the trunk number can be extracted (step S02). At this time, if the trunk number is not extracted (step S02; N), the processing proceeds to a step S03. If the trunk number is extracted (step S02; Y), the processing proceeds to a step S06.

If the processing proceeds to the step S03, the call control section 24 decides whether or not the received dial number is a priority control special number. At this time, if the dial number is not the priority control special number (step S03; N), a conventional connection processing is executed (step S04). Then, the processing in the exchange 13 is ended. On the other hand, if the dial number is the priority control special number (step S03; Y), the call control section 24 transfers an entry to the protocol control section 25 by using, as input information, an index indicating that the dial number is the priority control special number (step S05). Then, the processing proceeds to a step S12 in FIG. 8.

On the other hand, if the processing proceeds to the step S06, the call control section 24 executes a trunk acquisition processing. In other words, the call control section 24 indexes the table 31 (FIG. 6) with the trunk number extracted at the S01, and reads trunk attribute data corresponding to the trunk number (step S07).

Next, the call control section 24 decides whether or not the trunk kind included in the read trunk attribute data indicates the IP network connecting device (step S08). At this time, if the trunk kind does not indicate the IP network connecting device (step S08; N), the conventional connection processing is executed (step S09). Then, the processing in the exchange 13 is ended. On the other hand, if the trunk kind indicates the IP network connecting device (step S08; Y), the call control section 24 indexes the table 30 (FIG. 5) with the extension number of the call-out terminal, and reads extension number attribute data corresponding to the extension number (a media type of an extension and a priority class corresponding to the media type) (step S10).

Subsequently, the call control section 24 transfers an entry to the protocol control section 25 by using, as input information, an index indicative of the general call of a dial number, the read media type, a priority class and a trunk number. Then, the processing proceeds to a step S12 in FIG. 8.

At the step S12, the protocol control section 25 (FIG. 2) decides which index is included in the input information. At this time, if the index is indicative of general call, the processing proceeds to a step S13. If the index is indicative of a priority control special number, the processing proceeds to a step S14.

At the step S13, the protocol control section 25 transfers an entry to the edit section 26 by using, as input information, an edit message type "call setting message", a media type, a priority class and a trunk number, the processing proceeds to a step S15.

At the step S14, the protocol control section 25 transfers an entry to the edit section 26 by using an edit message type "INFO message" and a priority class "high priority" as input information, the processing proceeds to the step S15.

At the step S15, the edit section 26 show in FIG. 2 identifies the edit message type included in the input information. At this time, if the edit message type is a "call setting message", the processing proceeds to a step S16. If the edit message type is an "INFO message", the processing proceeds to a step S17.

At the step S16, the edit section 26 edits a call setting message in which a priority class is set to user information, a media type is set to high order layer integrity information and a dial number is set to a called number. The edit section 26 gives an entry to the transmission section 27. The processing proceeds to a step S18.

At the step S17, the edit section 26 edits an INFO message in which a priority class "high priority" is set to feature indication information. The edit section 26 gives an entry to the transmission section 27. The processing proceeds to the step S18.

At the step S18, the transmission section 27 shown in FIG. 2 transmits the ISDN message (the call setting message or the INFO message) edited at the step S16 or the step S17 toward an acquired trunk (the IP network connecting device). Then, the processing in the exchange 13 is ended.

(Connecting Device)

Figure 9:
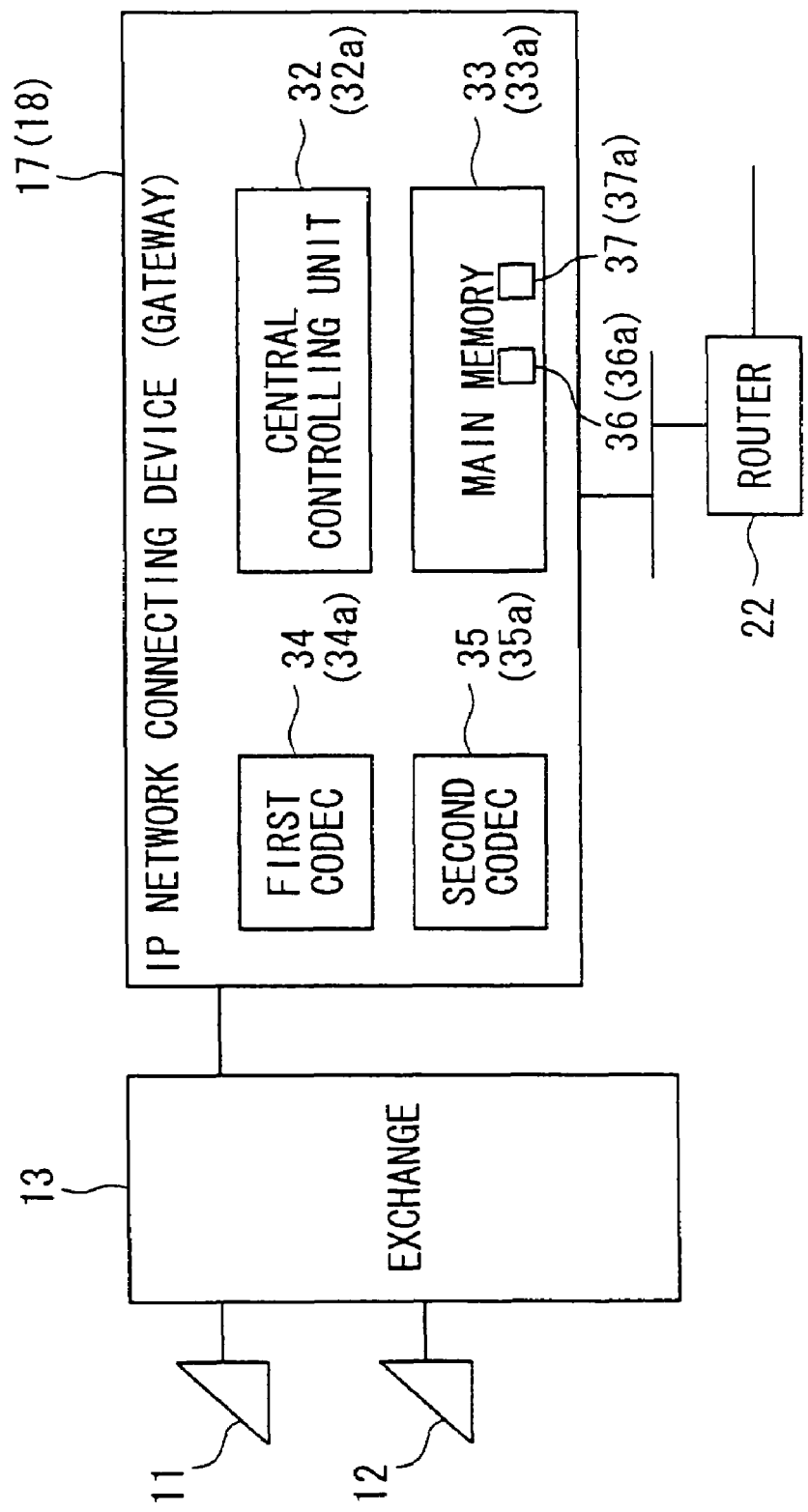
FIG. 9 is a diagram showing the structure of a connecting device illustrated in FIG. 1.

Next, the structures of the connecting devices 17 and 18 shown in FIG. 1 will be described. FIG. 9 is a diagram showing the structure of each of the connecting devices 17 and 18 illustrated in FIG. 1. In FIG. 9, the connecting device 17 includes a central controlling unit 32, a main memory (MM) 33, a first CODEC (speech compression decoder) section 34, a second CODEC section 35, and a communication control unit which is not shown. The MM 33 has a table 36 for managing a service type corresponding to a priority class (which will be hereinafter referred to as a "service type management table 36") and a table 37 for saving a service type corresponding to a call number (which will be hereinafter referred to as a "service type saving table 37").

Moreover, the connecting device 18 has almost the same structure as that of the connecting device 17. More specifically, the connecting device has a central controlling unit 32a, a MM 33a, a first CODEC section 34a, a second CODEC section 35a and a communication control unit (not shown). The MM 33a has a service type management table 36a and a service type saving table 37a.

The central controlling unit 32 is constituted by using a CPU, for example. The central controlling unit 32 executes a call connection processing, a voice transmission processing and the like between the extension terminals by executing various control programs held in a storage device (not shown) The MM 33 holds data to be used by the central controlling unit 32 and is used as a work area of the central controlling unit 32.

Figure 10:
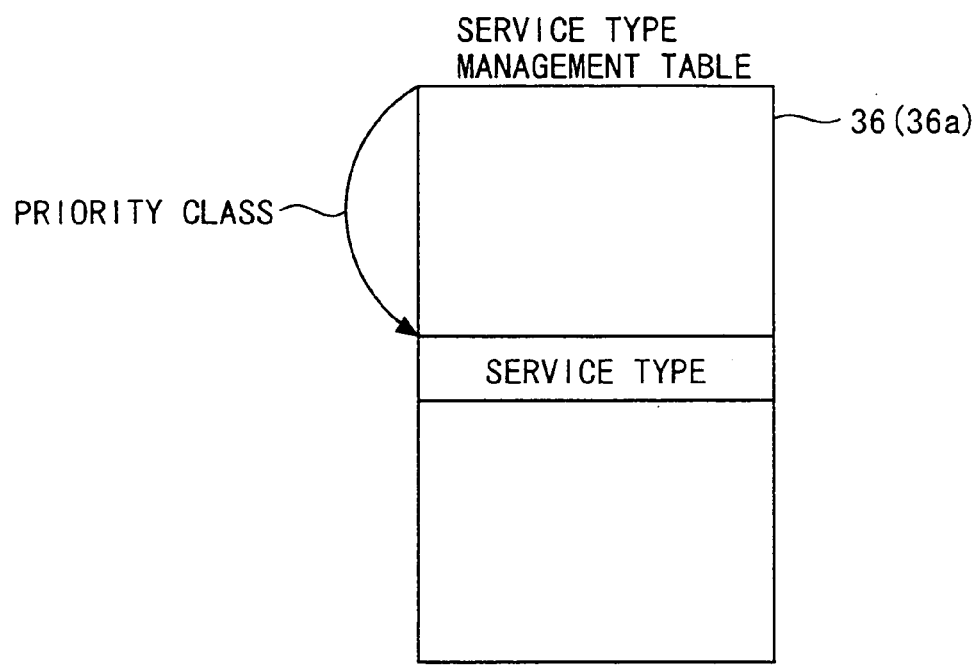
FIG. 10 is a diagram showing a table for managing a service type corresponding to a priority class illustrated in FIG. 9.

FIG. 10 is a diagram illustrating the service type management table 36 shown in FIG. 9. As shown in FIG. 10, the service type management table 36 holds a service type (priority information) corresponding to a priority class.

Figure 11:
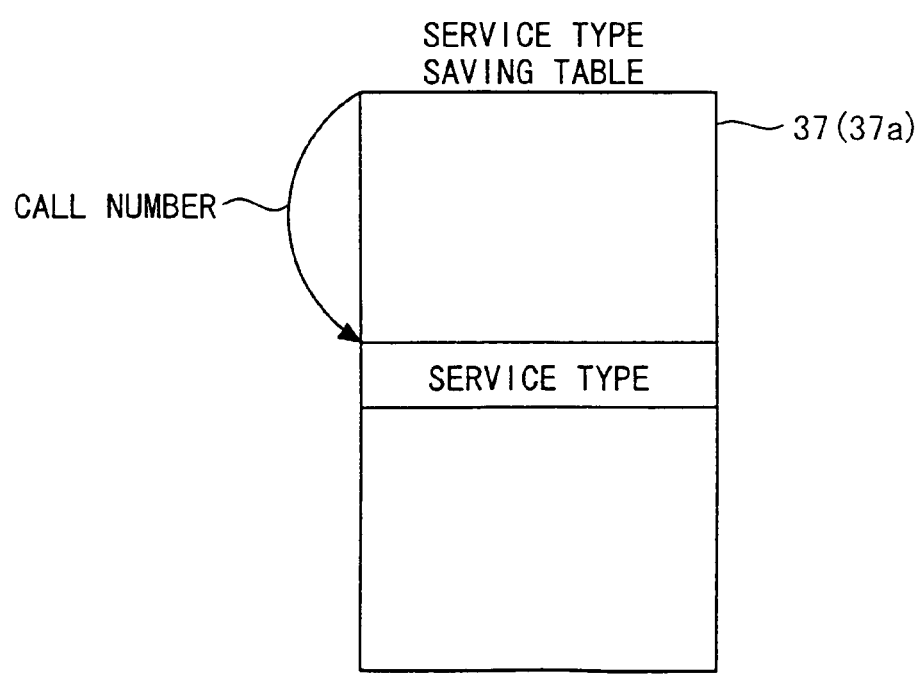
FIG. 11 is a diagram showing a table for saving a priority class corresponding to a call number illustrated in FIG. 9.

FIG. 11 is a diagram illustrating the service type saving table 37 shown in FIG. 9. As shown in FIG. 11, the service type saving table 37 holds a service type (priority information) corresponding to a call number. The service type saved in each of the tables 36 and 37 is set to an IP packet.

Returning to FIG. 9, the first CODEC section 34 and the second CODEC section 35 compresses and codes voice data received from the exchange 13 and extends and decodes a data field of a voice packet received from the IP network 16. The first CODEC section 34 and the second CODEC section 35 execute a CODEC processing in accordance with different standards. In this example, the first CODEC section 34 executes a CODEC processing in accordance with a standard of G729 Annex A (8K CS-ACELP). In the G729 Annex A, 80-byte μ Law data are compressed/extended into 10 bytes in a unit of 10 milliseconds (ms). In the case in which the voice data are treated, they are transferred as 10-byte packet data in accordance with RTP (RFC1889: Real Time Protocol). On the other hand, the second CODEC section 35 executes a CODEC processing in accordance with a standard of G723.1 (6.3K/5.3K MP-MLQ/ACELP). In the G723.1, 240-byte μ Law data are compressed/extended into 24/20 bytes in a unit of 30 milliseconds (ms). In the case in which the voice data are treated, they are transferred as 24-bype packet data in accordance with the RTP. The first CODEC section 34 and the second CODEC section 35 may execute the CODEC processing in accordance with a standard such as GSM (13K), G711, G722, G726 or G728 as the European digital portable telephone standard. Moreover, each of the connecting devices 17 and 18 may further include a CODEC section for executing a CODEC processing in accordance with a standard other than the standards set to the first CODEC section 34 and the second CODEC section 35.

Furthermore, the first CODEC section 34 and the second CODEC section 35 treat, as silence, a frame which cannot be recognized as a voice through a silence compressing method. Consequently, data corresponding to the silence are not transmitted to the IP network 16. Accordingly, a traffic on a transmission line can be reduced (it is generally said that 60% of a call is treated as the silence). The G7231.1 and the G729 Annex B define a silence detecting principle, and the CODEC sections 34 and 35 define sound/silence by referring to a flag in data.

(Operation in VoIP System)

Next, an operation in the above-mentioned VoIP system will be described.

(First Example of Operation)

Figure 12:
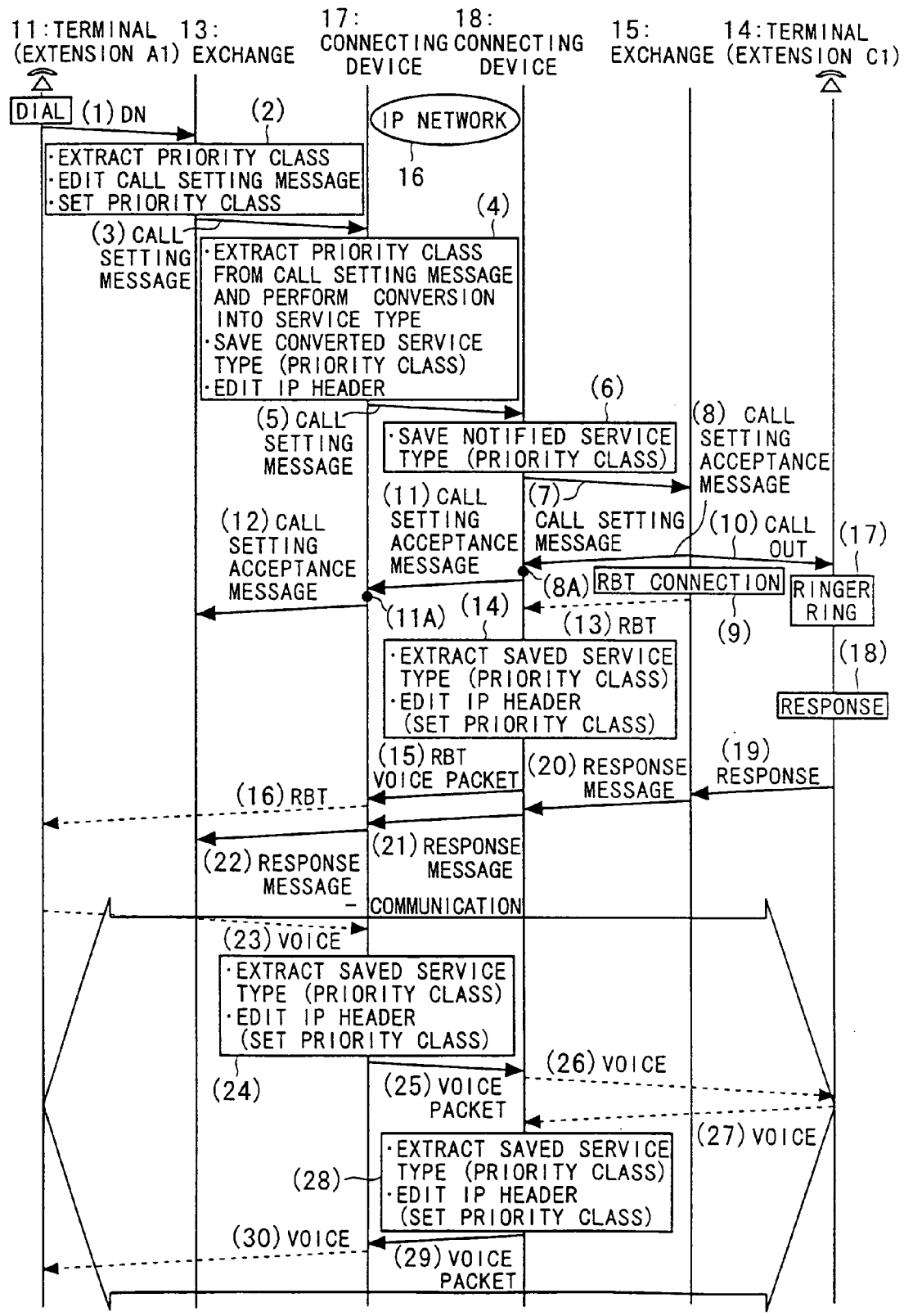
FIG. 12 is a sequence diagram showing a first example of an operation.

FIG. 12 is a sequence diagram showing a first example of the operation in the VoIP system. FIG. 12 shows an example in which voice communication is carried out between the extension terminal 11 (extension A1) and an extension terminal 14 (extension C1) illustrated in FIG. 1. The first example of the operation has the following premise.

(1) A dial number does not indicate a dial number for an emergency telephone of a police station, a fire department or the like but a general dial number.

(2) A media type indicates a "0: voice terminal".

First of all, a user of the extension terminal 11 dials telephone numbers from the extension terminal 11 to the extension terminal 13. Consequently, a dial number (DN) of the extension terminal 13 is transmitted from the extension terminal 11 to the exchange 14 (1).

When the exchange 13 receives the dial number, the call control section 24 recognizes a direction to the IP network 16 and executes the processing of the step S01 to the step S18 described above (see FIGS. 7 and 8) (2). Consequently, a call setting message including a media type "0: voice terminal" and a priority class corresponding to the media type, and the call setting message is prepared. The exchange 13 transmits the prepared call setting message to the connecting device 17 (3).

Figure 13:
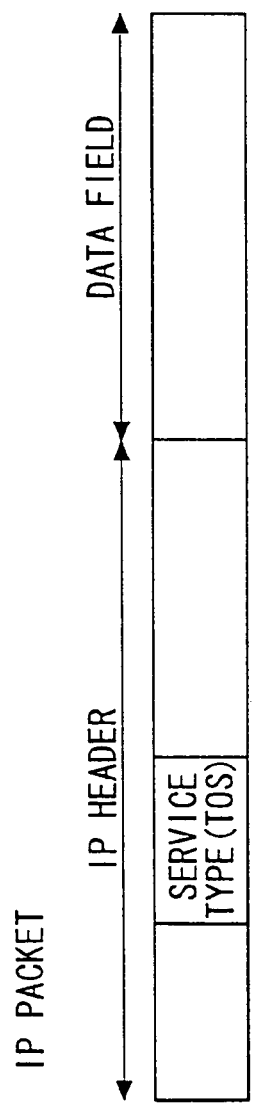
FIG. 13 is a diagram illustrating a format of a IP packet.

When the connecting device 14 receives the call setting message, the central controlling unit 32 shown in FIG. 9 edits a IP packet including the received call setting message in the connecting device 14 (4). More specifically, the central controlling unit 32 extracts a dial number from the call setting message and decides that the dial number is not a dial number for an emergency telephone to a police station, a fire department or the like. The central controlling unit 32 extracts the extension attribute data stored in the user/user information of the call setting message. More specifically, the central controlling unit 32 extracts the media type "0: voice terminal" corresponding to the extension number of a call-out terminal and a priority class corresponding to the media type. Next, the central controlling unit 32 indexes the service type management table 36 (see FIG. 10) by using the priority class included in the extension attribute data and extracts a service type corresponding to the priority class. Moreover, the central controlling unit 32 sets the extracted service type to a TOS (Type of Service) field in an IP header (see FIG. 13). Then, the central controlling unit 32 edits the IP packet by adding the IP header storing necessary information to the call setting message. Moreover, the central controlling unit 32 correlates a priority class included in the extension attribute data with a call number included in the call setting message and stores the priority class and the call number in the service type saving table 37. Consequently, the central controlling unit 32 can set, when a voice packet relating to this call is transmitted, the priority class corresponding to this call to the voice packet.

Then, the central controlling unit 32 obtains, based on a call-in number (destination number) in the received call setting message, the IP address of the connecting device 18 connected to the exchange 15 as a call-in exchange. The central controlling unit 32 sets the obtained IP address to a IP packet including the edited call setting message and transmits the IP packet to the IP network 16 (5). Consequently, the routers 22, 23 and the like in the IP network 16 can execute the priority control in accordance with the service type set to the TOS field during the congestion or the like.

Thereafter, the connecting device 17 transmits the IP packet including the call setting message to the IP network. The connecting device receives the IP packet from the IP network. In the connecting device 18, the central controlling unit 32a correlates the service type (priority class) included the call setting message with the call number included in the call setting message and saves the service type and the call number for the service type saving table 37a (6). In other words, a central controlling unit 32a of the connecting device 18 extracts the IP address on a call-in side included in the IP packet and confirmed that the destination of the IP packet is the connecting device 18. Subsequently, the central controlling unit 32a extracts the service type from the TOS field of the IP header of the IP packet. Next, the central controlling unit 32a extracts the call number from the call setting message. Next, the central controlling unit 32a stores the extracted service type and the extracted call number in the service type saving table 37a in the MM 33a.

Thereafter, the central controlling unit 32a extracts the call setting message from the IP packet and transmits the extracted call setting message to the exchange 15 (7). The transmitted call setting message is received by the exchange 15.

In the exchange 15, a call setting acceptance message corresponding to the call setting message is edited. Then, the central controlling unit 20a sets a priority class corresponding to the extension terminal 14 as a call-in terminal to the user/user information of the call setting acceptance message. However, the central controlling unit 20a may not set a priority class to the call setting acceptance message. The edited call setting acceptance message is transmitted to the connecting device 18 (8). Moreover, an opposite voice calling line is supplemented in the exchange 15. Consequently, a RBT (Ring Back Tone) is connected (9). On the other hand, the exchange 15 calls out the extension terminal 14 (extension C1) on the call-in side (10).

The connecting device 18 receives the call setting acceptance message transmitted from the exchange 15. In the connecting device 18, a IP packet is edited by that a IP header is given to the call setting acceptance message.

The central controlling unit 32a of the connecting device 18, when the call setting acceptance message includes the priority class corresponding to the call-in terminal, performs processing as follows (8A). That is, the central controlling unit 32a extracts the priority class from the call setting acceptance message. Next, the central controlling unit 32a reads out a service type corresponding to the extracted priority class from the service type management table 36a. Next, the central controlling unit 32a reads out a service type (a service type is saved in the above-mentioned processing (6)) corresponding to the call number included in the call setting acceptance message from the service type saving table 37a. Next, the central controlling unit 32a compares the service type read out from the table 36a and the service type read out from the table 37a. If the service type read out from the table 36a is higher than the service type read out from the table 37a, the central controlling unit 32a stores (updates) the service type read out from the table 36a in the table 37a. On the other hand, if the service type read out from the table 37a is higher than the service type read out from the table 36a, the central controlling unit 32a does not update the table 37a.

Thereafter, the edited IP packet is transmitted to the connecting device 17 through the IP network 16. When the connecting device 17 receives the IP packet, the call setting acceptance message is extracted from the received IP packet.

When the call setting acceptance message includes the priority class corresponding to the call-in terminal, the central controlling unit 32a of the connecting device 17 performs processing as follows (11A). That is, the central controlling unit 32 extracts the priority class from the call setting acceptance message. Next, the central controlling unit 32 reads out a service type corresponding to the extracted priority class from the service type management table 36. Next, the central controlling unit 32 reads out a service type (a service type is saved in the above-mentioned processing (4)) corresponding to the call number included in the call setting acceptance message from the service type saving table 37. Next, the central controlling unit 32 determines whether the service type read out from the table 36 is higher than the service type read out from the table 37 or not. If the service type read out from the table 36 is higher than the service type read out from the table 37, the central controlling unit 32 stores (updates) the service type read out from the table 36 in the table 37. On the other hand, if the service type read out from the table 37 is higher than the service type read out from the table 36, the central controlling unit 32 does not update the table 37a. Thus, if the service type (priority class) corresponding to the call-in terminal is higher than the service type (priority class) corresponding to the call-out terminal, the service type corresponding to the call-in terminal is adopted, as a service type corresponding to the call number.

Thereafter, the connecting device 17 transmits the extracted call setting acceptance message to the exchange 13. The exchange 13 receives the call setting acceptance message.

The RBT connected to the opposite voice calling line is input to the first CODEC section 34a or the second CODEC section 35a in the connecting device 18 through a TDM (time division multiplex) interface. Consequently, the RTB is converted into voice packet data by the first CODEC section 34a or the second CODEC section 35a. Then, the IP header is added to the converted voice packet data. As a result, the IP packet (RBT voice packet) is edited (14).

In the case in which the RBT voice packet is to be edited, a service type corresponding to a calling number is read from the service type saving table 37a and is set to the TOS field of the IP header. The edited RBT voice packet is transmitted to the IP network 16 (15).

The service type set to the TOS field is recognized by the exchange (for example, the router 22 or 23) provided on the transmission line for the RBT voice packet in the IP network 16 and is utilized when the router 22, 23 or the like executes the priority control (for example, congestion control).

The connecting device 17 receives the RBT voice packet transmitted from the connecting device 18 through the IP network 16. In the connecting device, consequently, the voice packet data in the received RBT voice packet are decoded into the RBT by the first CODEC section 34 or the second CODEC section 35.

Then, the decoded RBT is transmitted to the exchange 13 through the TDM interface of the connecting device 17 and is transferred to a line circuit of the extension A1 (extension terminal 11) through the network circuit of the exchange 13 (16).

When the extension terminal 14 (extension C1) is called out by the exchange 15 (10), a ringer of the extension C1 rings (17). When the user of the extension C1 carries out a response operation (for example, the user takes a receiver of a telephone set) (18), a response signal is input from the extension C1 to the exchange 15 (19). Consequently, the exchange 15 detects the response of the extension C1, edits a response message corresponding to the detected response, and transmits the edited response message to the connecting device 18 (20).

When the response message is received in the connecting device 18, the central control section 32a gives an IP header to the response message, thereby, a IP packet including the response message is edited. The connecting device 18 transmits the edited IP packet to the IP network 16 (21).

The connecting device 17 receives the transmitted IP packet from the IP network 16. The connecting device 17 extracts the response message from the received IP packet and transmits the extracted response message to the exchanger 13 (22). Consequently, a call is established between the extension terminal 11 and the extension terminal 14. Thereby, the extension A1 (extension terminal 11) accommodated in the exchange 13 and the extension C1 (extension terminal 14) accommodated in the exchange 15 are brought into a communication state. Thereafter, when a voice is input to the extension terminal 11, a signal (PCM (pulse code modulation) signal) including voice data corresponding to the input voice is received by the connecting device 17 from the exchange 13.

In the connecting device 17, the first CODEC section 34 or the second CODEC section 35 converts the received voice signal into voice packet data. Then, the central control section 32 edits an IP packet (voice packet) included in the voice data by attaching an IP header to the voice packet data (24).

At this time, the central control section 32 obtains the service type acquired during the call setting processing from the service type saving table 37 and sets the service type to the TOS field of the IP header. Thereafter, the edited voice packet is transmitted from the connecting device 17 to the IP network 16 (25).

The service type set to the TOS field is utilized for carrying out the priority control by the routers 22 and 23 in the IP network 16. More specifically, in the IP network 16, the priority control is executed in accordance with a priority class designated by the exchange 13.

Subsequently, the voice packet is received by the connecting device 18. In the connecting device 18, the voice packet data is extracted from the voice packet and the first CODEC section 34a or the second CODEC section 35a decodes the voice packet data into voice data. The decoded voice data is transferred from the TDM interface of the connecting device 18 to the line circuit of the extension C1 through the network circuit of the exchange 15 (26). Consequently, a voice corresponding to the voice data is output from the extension C1 and the user of the extension C1 can hear the voice input from the extension A1.

On the other hand, if the voice is input to the extension A1, voice data corresponding to the same voice are input to the connecting device 17 through the exchange 15 (27). In the connecting device 18, the input voice data is converted into a voice packet data through the first CODEC section 34a or the second CODEC section 35a.

Thereafter, the central controlling unit 32a in the connecting device 18 edits the voice packet by adding the IP header to the voice packet data (28). At this time, the central controlling unit 32a extracts a service type corresponding to a call number for the calling (a service type acquired during the call setting processing for the communication) from the service type saving table 37a. The central controlling unit 32a sets the extracted service type to the TOS field of the IP header. Subsequently, the edited voice packet is transmitted to the IP network (29).

The connecting device receives the voice packet from the IP network 16. The central controlling unit 32 of the connecting device 17 extracts the voice packet data from the received voice packet. The extracted voice packet data is decoded into voice data in the first CODEC section 34 or the second CODEC section 35.

The decoded voice data is transferred from the TDM interface of the connecting device 17 to the line circuit of the extension A1 through the network circuit of the exchange 13. Consequently, a voice corresponding to the voice data is output from the extension A1 and the user of the extension A1 can hear the voice input from the extension C1.

Figure 14:
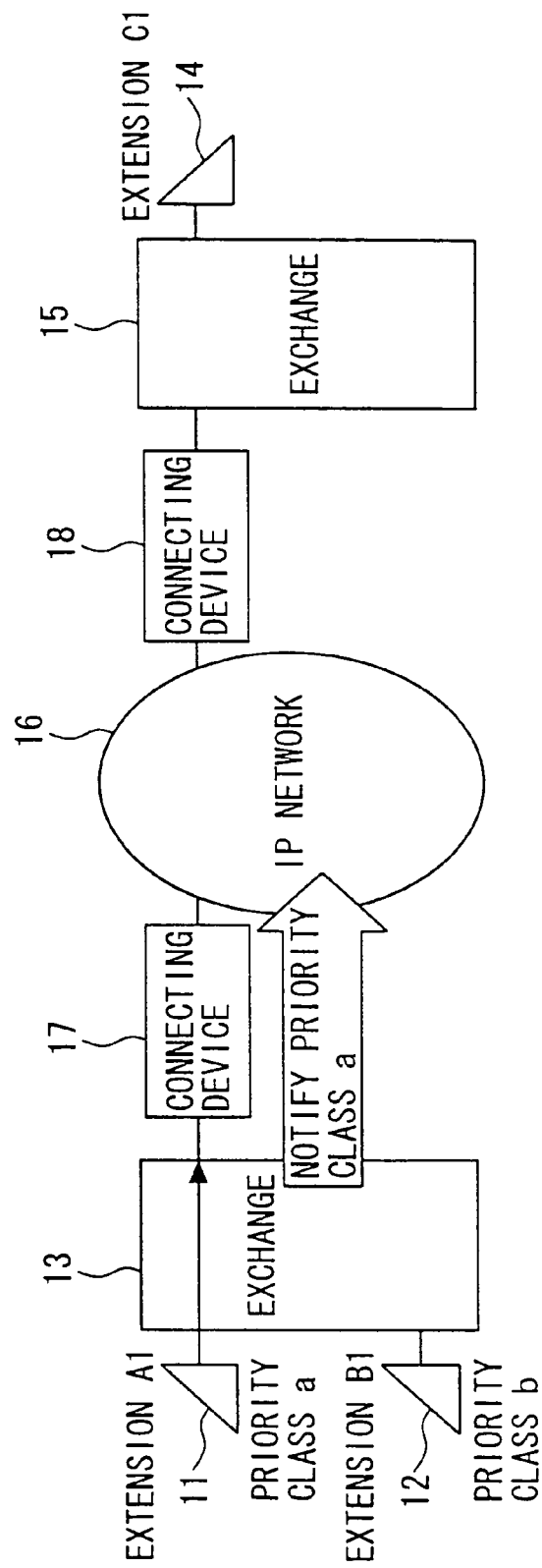
FIG. 14 is a diagram illustrating the action of the first example of the operation.

According to the first example of the operation, a priority class is set to each extension number of the extension terminal (extension) accommodated in each of the exchanges 13 and 15. Each of the exchanges 13 and 15 holds information relating to the set priority class (see FIG. 14).

Thereafter, in the case in which a call is set between the extension terminals through the IP network 16, a priority class corresponding to the extension number of the call-out terminal is given from the exchange to the connecting device. The connecting device acquires a service type corresponding to the priority class and holds the service type and a call number corresponding to the service type.

Thereafter, the connecting device, when transmits a voice packet to the IP network 16, sets a service type corresponding to the communication to the voice packet. Subsequently, in the IP network, when exchanges or transmitting devices on a route of the voice packet, for example, the router 22, 23 or the like receive the voice packet from the connecting device 17, the service type in the voice packet is referred and the priority control corresponding to the service type is executed. For example, the congestion control of the IP network 16 is executed.

More specifically, if the congestion is occurred in the IP network 16, the exchange or transmitting device (for example, the router 22) in the IP network 16 detects the congestion. Consequently, the router 22 extracts a service type of the voice packet received by itself and executes a processing (congestion control) for eliminating the congestion based on the extracted service type. For example, the router 22 changes the order of transmission of the voice packet, gives the generation of the congestion to the connecting device and discards the voice packet. Consequently, the voice packet to which a service type corresponding to a high priority class is set is transmitted from the router 22 preferentially. Accordingly, the delay and loss of the voice packet can be suppressed and the quality of voice communication can be maintained. On the other hand, a voice packet to which the service type corresponding to a low priority class is set is discarded or the transmission, to the IP network 16, of a voice packet to which a low priority class is set can be suppressed. Consequently, the congestion in the IP network 16 can be eliminated.

According to the VoIP system according to the embodiment, thus, a service type corresponding to a priority class according to the extension number is set to the voice packet. For this reason, the contents of the priority control in the IP network 16 can be set for each extension (extension terminal) accommodated in the exchange. For example, it is possible to execute the congestion control of the IP network 16 depending on the importance of an extension (priority class). Accordingly, the reliability of the VoIP system can be enhanced.

In the VoIP system according to the present embodiment, moreover, the priority class corresponding to the media type is given from the exchange 13 to the connecting device 17. Therefore, the central controlling unit 32 of the connecting device 17 can set, to the voice packet, the service type corresponding to the priority class depending on the media type. Consequently, in the case in which data requiring higher quality of communication than that of the voice data are transmitted from a call-out terminal to a call-in terminal, the priority control is executed for the data in a higher priority class than a priority class set to voice communication in the IP network. On the other hand, in the case in which data having a lower consideration for a transmission delay than that of the voice data are transmitted from the call-out terminal to the call-in terminal, the priority control is executed for the data in a lower priority class than a priority class set in the case of voice communication in the IP network. Accordingly, the priority control corresponding to the attribute of data to be transmitted can be executed in the IP network 16.

As definition related to the media in the VoIP system, the following FAX transmitting method, data transmitting method and image (dynamic image) data transmitting method can be used.

(1) FAX transmitting method (the media type of an extension terminal is a FAX terminal)
   Real-time FAX transmission
      Fax Relay: FRF.11 Annex D
      T.38
(2) Data transmitting method (the media type of an extension terminal is a data terminal)
   Correspondence to an internet protocol
      RFC854 (telenet)
      RFC959 (FTP: File Transfer Protocol)
(3) Image data transmitting method (the media type of an extension terminal is an image terminal)
   Referring to an image data format, correspondence to a specified format such as MPEG is carried out. Referring to dynamic image transfer, real-time data transmission is required in the same manner as a voice.
(4) As a signaling transmitting method, H225, H245, H323, H450 and the like are currently standardized.
   There are the following future standardization trends.
   "Mapping QSIG to H.225.0" (ECMA proposal)
   "Tunneling QSIG over H.225.0" (ECMA proposal)
   "QSIG+ as a replacement for H.225.0" (Japan proposal)

(Second Example of Operation)

Figure 15:
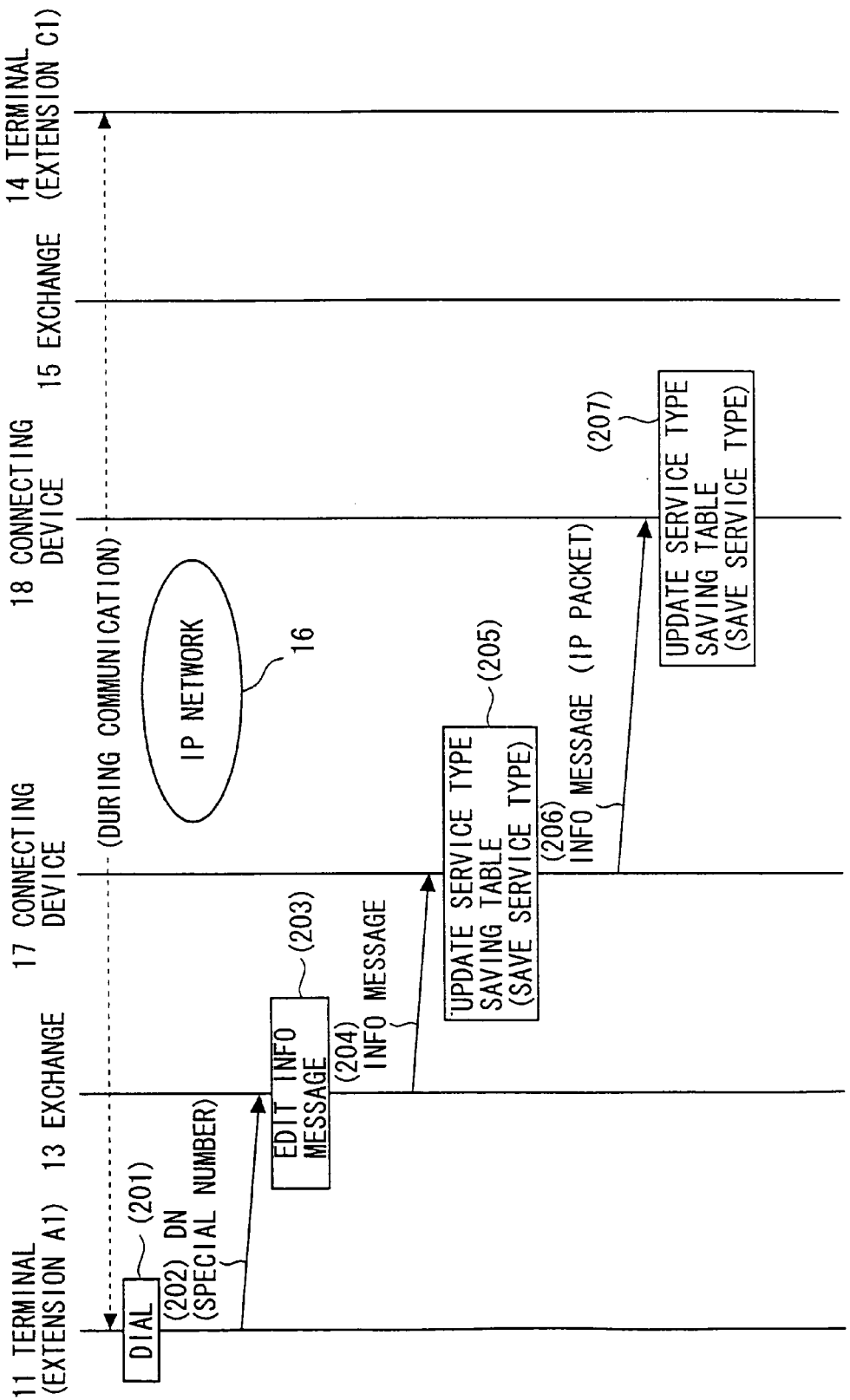
FIG. 15 is a sequence diagram showing a second example of the operation.

Next, a second example of an operation of the VoIP system will be described. FIG. 15 is a sequence diagram showing the second example of the operation. In the second example of the operation, it is assumed that a congestion is generated on the IP network 16 during a conversation of the extension terminal 11 (extension A1) and the extension terminal 14 (extension C1) in the first example of the operation. When the congestion is generated in the IP network 16, the quality of a voice for the conversion is sometimes deteriorated.

Therefore, a user of the extension A1 or C1 (the extension A1 in FIG. 15) dials a priority control special number (201). Consequently, a dial number of the priority control special number is input from the extension A1 to the exchange 13 (202)

When the exchange 13 receives the priority control special number, the processings shown in FIGS. 7 and 8 are executed in the exchange 13 so that an INFO message included in a priority class "high priority" is edited (203).

Then, the edited INFO message is transmitted from the exchange 13 to the connecting device 17 (204).

When the connecting device 17 receives the INFO message, the central controlling unit 32 extracts a service type corresponding to the priority class "high priority" included in the INFO message. Subsequently, the central controlling unit 32 updates the service type saving table 37, thereby, the extracted service type is stored in the service type saving table 37 (205). Consequently, the priority class for the calling between the extension terminal 11 and the extension terminal 14 can be increased.

Then, the central controlling unit 32 edits a IP packet including the INFO message storing the extracted service type in the TOS field and transmits the IP packet to the connecting device 18 through the IP network 16 (206).

When the connecting device 18 receives the IP packet, the central controlling unit 32a extracts a service type from the IP packet and updates the corresponding portion of the service type saving table 37a with the same service type (207).

Then, in the case in which the voice packet is transmitted from the connecting devices 17 and 18 to the IP network 16 through a voice input to the extension terminals 11 and 14, a service type set to the voice packet is increased to a service type corresponding to a priority class "high priority". Consequently, even if congestion occurs in the IP network 16, a processing for suppressing deterioration in the quality of a voice is carried out preferentially about a voice packet related to the communication. Accordingly, the delay and loss of the voice packet can be suppressed.

According to the second example of the operation, when the quality of a voice is deteriorated during the communication, if the user dials the priority control specific number, a service type (priority class) rises to be higher than a priority class corresponding to a call-out terminal (extension number) Consequently, it is possible to suppress deterioration in the quality of a voice, for example, an interruption of a voice, a disconnection of the communication and the like.

(Third Example of Operation)

Figure 16:
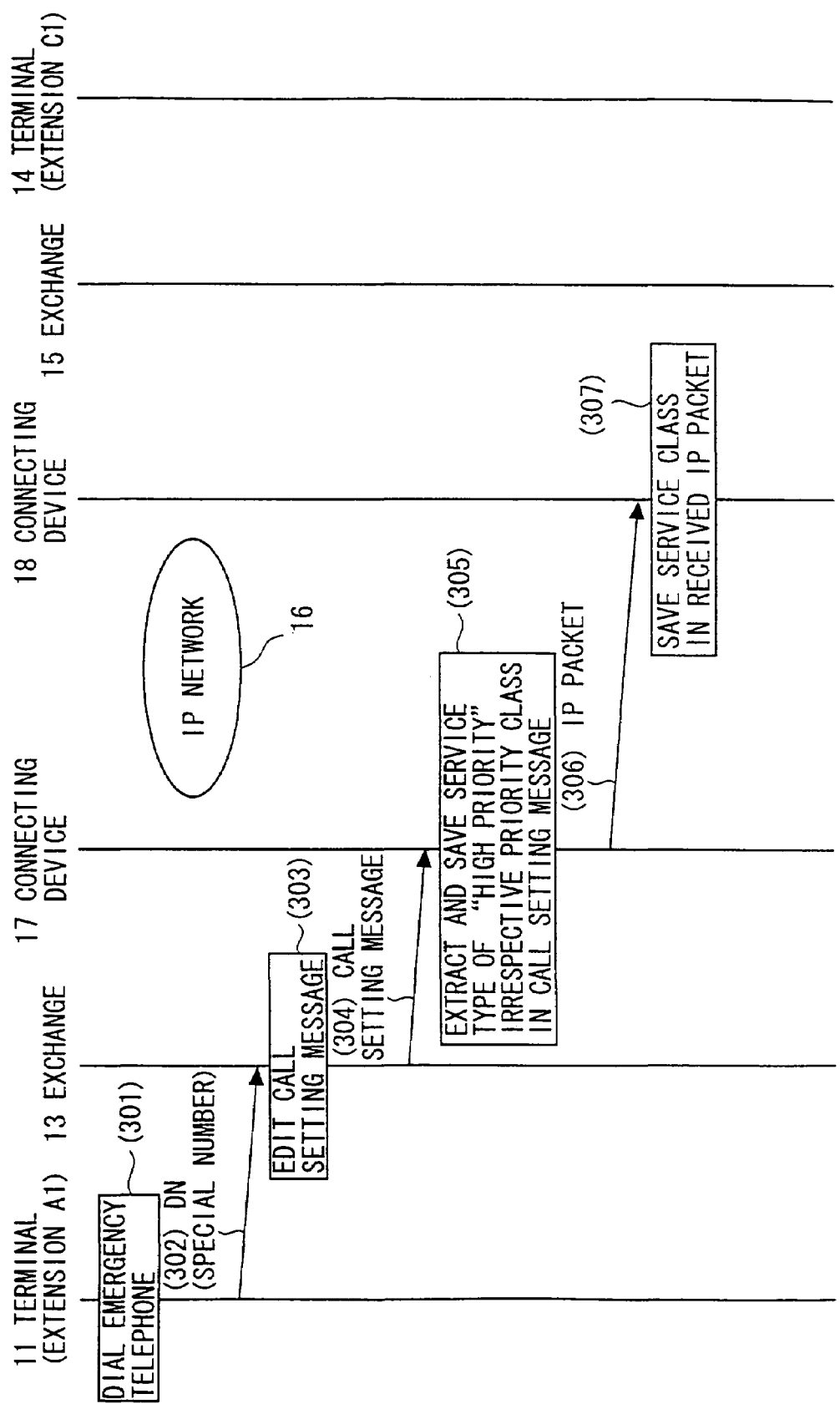
FIG. 16 is a sequence diagram showing a third example of the operation.

A third example of an operation of the VoIP will be described. FIG. 16 is a sequence diagram showing the third example of the operation. In the third example of the operation, a dial number dialed by using an extension terminal is a dial number for an emergency telephone to a police station, a fire department or the like.

In FIG. 16, when the number of the emergency telephone is dialed through the extension terminal 11 (301), the dialed dial number is input to the exchange 13 (302). In the exchange 13, a call setting message is edited by the execution of the operations shown in FIGS. 7 and 8 (303). The call setting message is transmitted to the connecting device 17 (304).

When the connecting device 17 receives the call setting message, the central controlling unit 32 of the connecting device 17 analyzes the dial number of a call-in terminal which is included in the call setting message. When the central controlling unit 32 recognizes that the dial is the number for the emergency telephone, extracts a service type corresponding to a priority class (for example, a priority class "high priority") which is higher than a priority class included in the call setting message from the service type management table 36. The central controlling unit 32 stores the extracted service type in the corresponding portion of the service type saving table 37 (305). Then, the central controlling unit 32 transmits, to the IP network 16, a IP packet including the call setting message storing a service type corresponding to the priority class "high priority" in the TOS field (306).

When the connecting device 18 receives the IP packet from the IP network 16, the central controlling unit 32a of the connecting device 18 extracts the service type stored in the TOS field of the IP packet. The central controlling unit 32a stores the extracted service type in the service type saving table 37a (307). Thereafter, operations on and after the (7) shown in FIG. 12 are carried out. At this time, the service type corresponding to the priority class "high priority" is set to the RBT voice packet and the voice packet which are transmitted toward the IP network 16.

According to the third example of the operation, if a number dialed at a call-out terminal is a number for an emergency telephone, a service class corresponding to a higher priority class than a priority class set to the extension number of the call-out terminal is set to a voice packet. Accordingly, if the dialed dial number is a number for an emergency communication destination, even if a congestion is generated on the IP network 16, it is prevented that the quality of a voice related to a communication deteriorate. Therefore, a proper communication can be carried out between the call-out terminal and the call-in terminal.

(Fourth Example of Operation)

A fourth example of an operation will be described. As the fourth example of the operation, description will be given to an operation to be carried out when call setting is carried out in each of the connecting devices 17 and 18. As an example, the operation of the connecting device 17 will be described below.

In the case in which a calling is set between the extension terminal 11 and the extension terminal 14, a call setting message is transmitted from the exchange 13 to the connecting device 17 as described in the first example of the operation (see FIG. 12 (3)).

Figure 17:
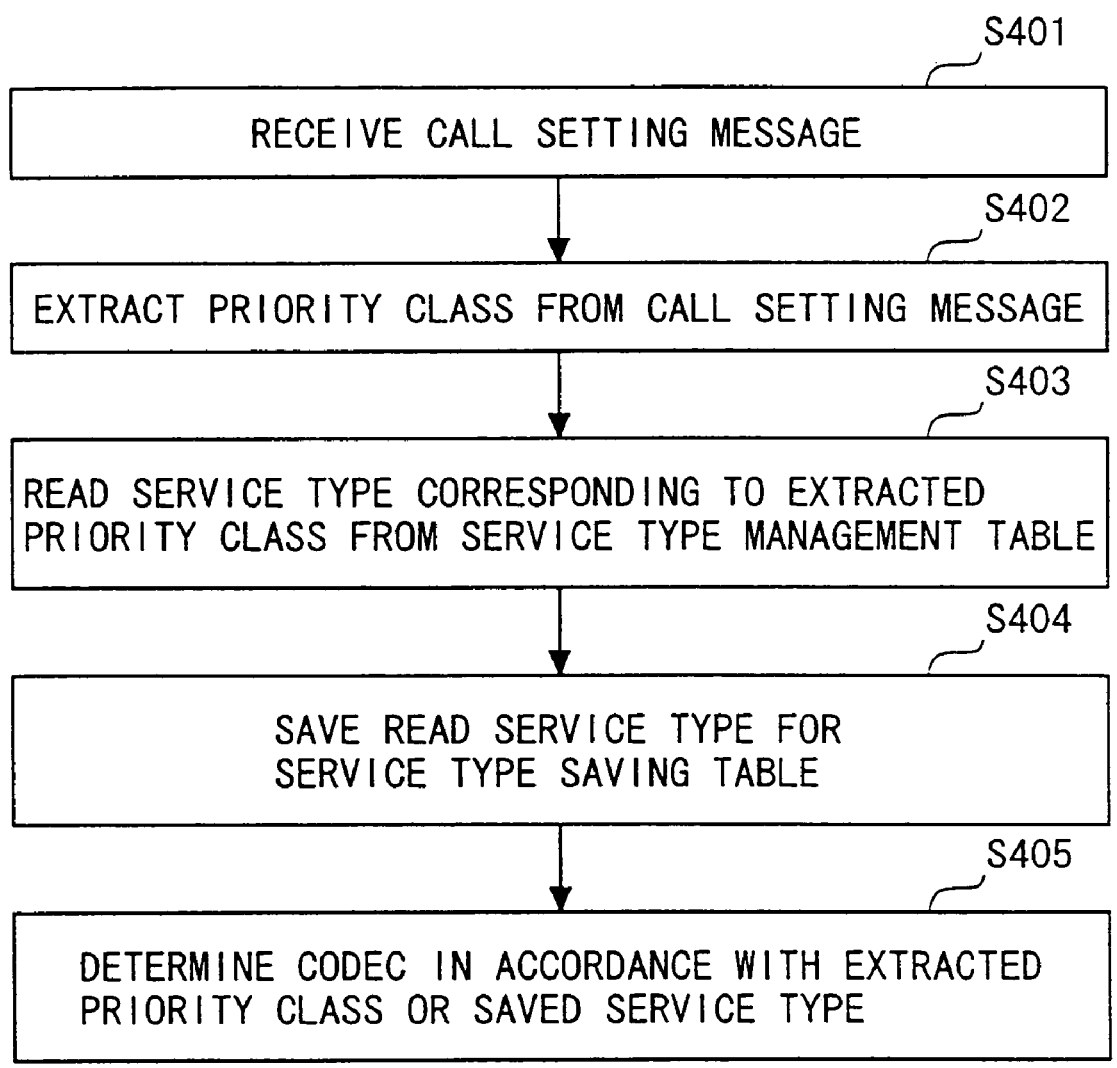
FIG. 17 is a flow chart illustrating a fourth example of the operation.

When the central controlling unit 32 of the connecting device 17 receives the call setting message, it executes the processing of (4) shown in FIG. 12. As shown in a flow chart of FIG. 17, when the central controlling unit 32 receives a call setting message (step S401), a priority class is extracted from the call setting message (step S402). a service type corresponding to the extracted priority class is read out from the service type management table 36 (step S403).

Subsequently, the central controlling unit 32 saves the read service type corresponding to the call number in the service type saving table 37 (step S404). Thereafter, the central controlling unit 32 determines a CODEC for compressing and encoding voice data corresponding to the priority class extracted at the step S402 (step S405).

For example, if the extracted priority class is "high priority", the central controlling unit 32 selects the first CODEC section 34 for packeting a voice in a cycle of 10 microsecond. On the other hand, if the extracted priority class is the lowest priority class, the central controlling unit 32 selects the second CODCEC section 35 for packeting a voice in a cycle of 30 microsecond.

Thereafter, if the call is established and the connecting device 17 receives voice data from the exchange 13, the central controlling unit 32 executes the compressing and encoding processing of the voice data through the determined CODEC.

In the case in which the voice data is compressed and encoded by the first CODEC section 34, a time required for editing a voice packet can be more shortened than that in the case in which the voice data is compressed and encoded by the second CODEC section 35. For this reason, the number of the voice packets transmitted from the connecting device 17 per unit time is set in descending order from the highest priority class. Accordingly, it is possible to ensure the quality of a voice in descending order from the highest priority class.

Thus, the central controlling unit 32 selects either of the first CODEC section 34 and the second CODCEC section 35 in accordance with the extracted priority class. Consequently, a standard of CODEC (standard of compressing and encoding) corresponding to the priority class is determined. Thus, the quality of a voice corresponding to the priority class can be ensured.

(Fifth Example of Operation)

Next, a fifth example of an operation will be described. Referring to the fifth example of the operation, the operation of each of the connecting devices 17 and 18 is carried out when a congestion is generated on the IP network 16 during a calling between a call-out terminal and a call-in terminal. As an example, the operation of the connecting device 17 will be described.

Figure 18:
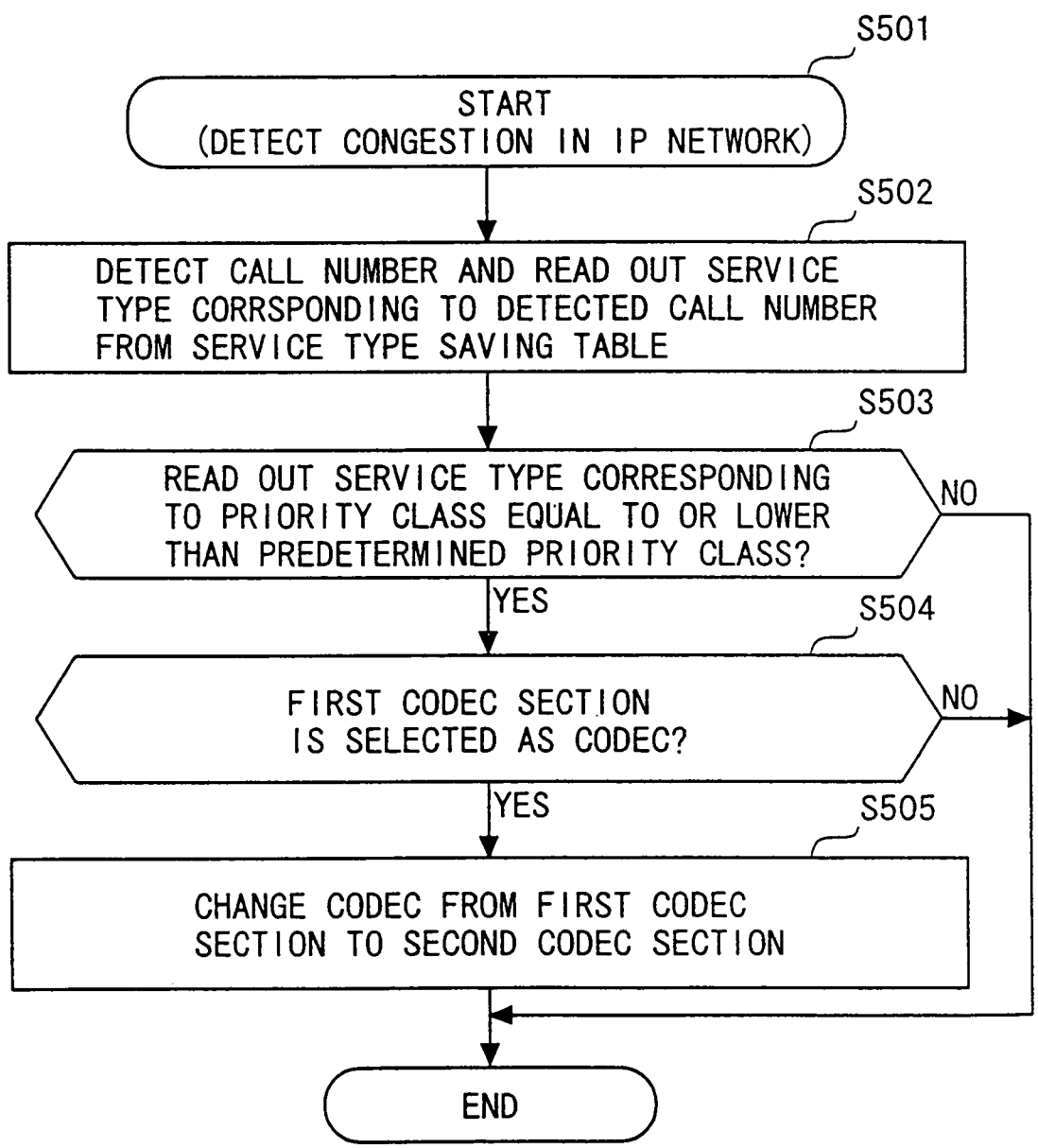
FIG. 18 is a flow chart illustrating a fifth example of the operation.

When the congestion is generated on the IP network 16, an indication of the generation of the congestion is given from the IP network 16 to each of the connecting devices 17 and 18. Consequently, the central controlling unit 32 of the connecting device 17 carried out the operation shown in a flow chart of FIG. 18.

More specifically, when the central controlling unit 32 detects the congestion of the IP network 16 (step S501), the central controlling unit 32 reads out a service type corresponding to a call which the congestion have been occur from the service type saving table 37 (step S502).

Subsequently, the central controlling unit 32 determines whether or not the read service type corresponds to a priority class which is equal to or lower than a predetermined priority class (step S503). At this time, in the case in which the service type corresponds to a lower priority class than the predetermined priority class, the central controlling unit 32 determines whether or not the first CODEC section 34 is selected as a CODEC for compressing and encoding voice data corresponding to the call (step S504). If the first CODEC section 34 is selected (step S504; Y), the central controlling unit 32 changes the CODEC for compressing and encoding the voice data corresponding to the call from the first CODEC section 34 to the second CODEC section 35 (step S505).

Consequently, the voice packet corresponding to the call is compressed and encoded by the second CODEC section 35. Accordingly, the number of the voice packets edited in a unit time is decreased so that the number of the voice packets transmitted to the IP network 16 is reduced. Thus, the congestion in the IP network 16 can be relieved.

On the other hand, the voice data corresponding to the call having a higher priority class than the predetermined priority class set thereto are compressed and encoded by the first CODEC section 34. Consequently, a deterioration in the quality of a voice can be suppressed and the quality of communication can be maintained.

As a reference for each of the connecting devices 17 and 18 to decide the delay of a voice packet, the following recommendation is defined for END-to-END Delay in ITU-T G114.

0 to 150 ms: allowable 150 to 400 ms: allowable if it is permitted by a manager (almost the same quality as that in satellite communication)

400 ms or more: not allowable for general uses. Interwork with satellite communication and cellular In special cases, for example, a television meeting using satellite communication, interwork for mutual cellular and the like, the above-mentioned limitations may be exceeded.

In the VoIP system, moreover, the following apparatus and delay are related to the END-to-END Delay.

network access apparatus (router or the like)

In general, a delay is approximately 10 ms.

transmission network

ISDN line: 7 ms public frame relay 20 to 40 ms (one of terminals)

internet 50 to 400 ms (Sixth Example of Operation)

Next, a sixth example of an operation will be described. The sixth example of the operation is different from the fourth and fifth examples of the operation described above and only the first CODEC section 34 and 34*a* are used for compressing and encoding voice data in the connecting devices 17 and 18, for example.

Figure 19:
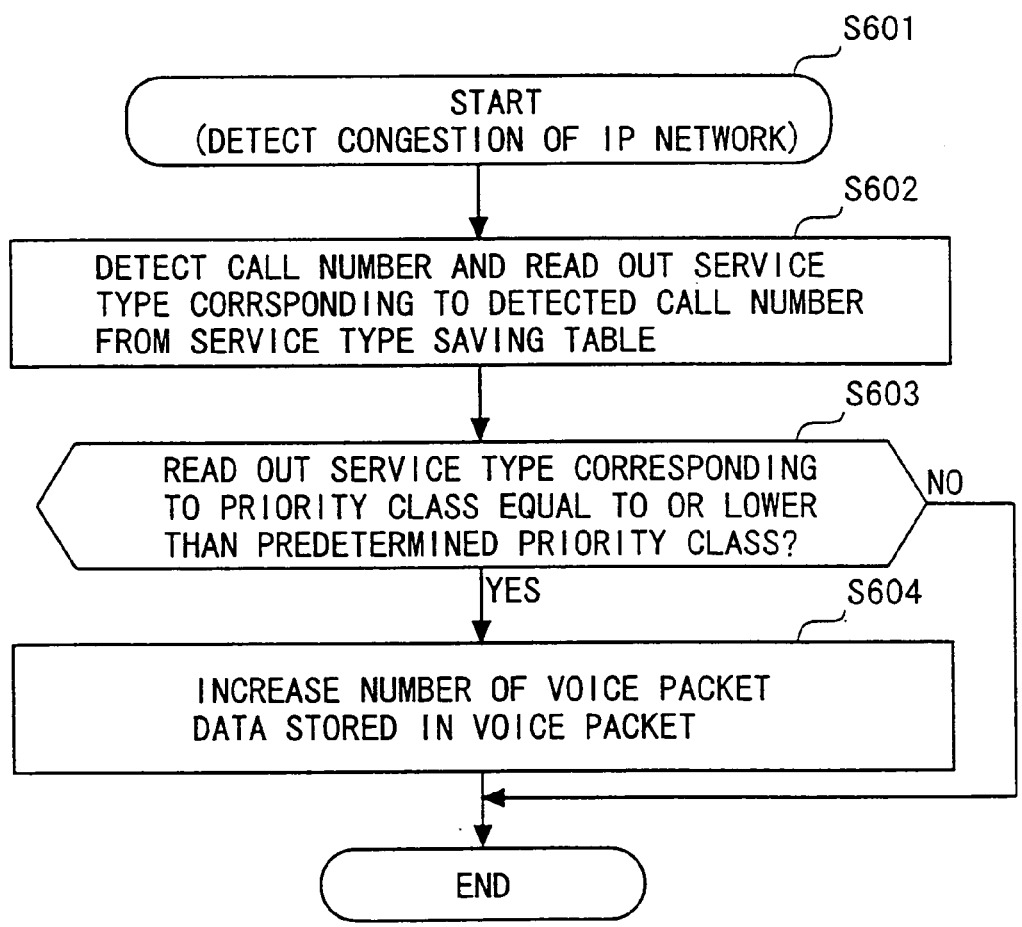
FIG. 19 is a flow chart illustrating a sixth example of the operation.
Figure 20:
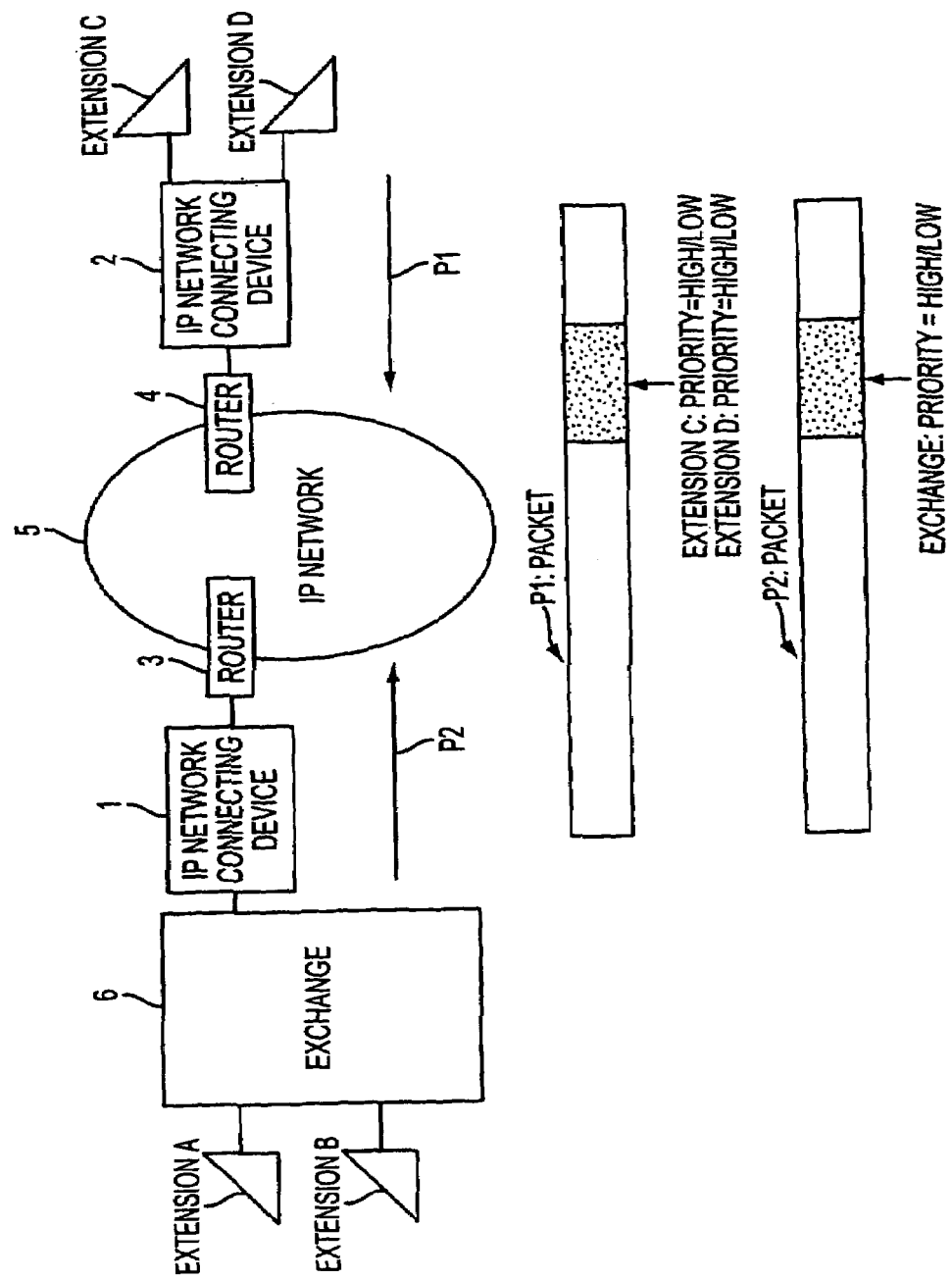
FIG. 20 is a diagram illustrating a conventional art.

In the sixth example of the operation, only the first CODEC section 34 (first CODEC section 34*a*) is selected as a CODEC for compressing and encoding the voice data during call setting. Then, the congestion is occurred in the IP network 16 during the communication (calling) and is detected by each of the connecting devices 17 and 18. In each of the connecting devices 17 and 18, consequently, operations shown in a flow chart of FIG. 19 are carried out respectively. The connecting device will be taken as an example of the description.

When the central controlling unit 32 of the connecting device 17 detects the congestion (step S601), it reads a service type corresponding to a currently set calling from the service type saving table 37 (step S602). Subsequently, the central controlling unit 32 decides whether or not the read service type corresponds to a lower priority class than a predetermined priority (step S603). At this time, if the service type corresponds to a priority class which is equal to or lower than the predetermined priority class (step S603; Y), the central controlling unit 32 increases the number of voice packet data to be stored in a voice packet (step S604).

By the above-mentioned operation, a transmission spacing of the voice packet corresponding to a calling having a priority class equal to or lower than the predetermined priority class set thereto is increased. Accordingly, about the call, the number of the voice packets which are transmitted per unit time is decreased and the number of the voice packets transmitted to the IP network 16 is reduced. Consequently, the congestion in the IP network 16 can be relieved.

On the other hand, the number of the voice packet data stored in the voice packet corresponding to a calling having a higher priority class than the predetermined priority class set thereto is not changed. Consequently, the number of the voice packets corresponding to the calling which are transmitted is not changed.

Accordingly, the voice packet having a high priority class is transmitted to the IP network 16 preferentially. For the calling having a high priority class, thus, a deterioration in the quality of a voice can be suppressed preferentially so that the quality of communication can be maintained.

What is claimed is:

1. A priority control method of a network system for providing a communication between terminals comprising a first exchange for accommodating a plurality of first terminals, a first connecting device connected with the first exchange, an IP network connected with the first connecting device, a second connecting device connected with the IP network, and a second exchange for accommodating at least one of a second terminal, the second exchange is connected with the second connecting device, wherein the first exchange holds priority classes corresponding to each of the first terminals;

the first connecting device holds service types corresponding to each of the priority classes held in the first exchange;

the first exchange, when a call is set between any one of the first terminals as a call-out terminal and the second terminal as a call-in terminal through the IP network, notifies the first connecting device of a priority class corresponding to the first terminal as a call-out terminal;

the first connecting device reads ant a service type corresponding to the notified priority class, saves the read out service type; and the first connecting device, when transmitting packers comprising data from the first terminal as the call-out terminal to the IP network after the call is established, sets the saved service type to the packers, thereby, priority control according to the service type set to the packets is performed in the IP network, wherein the first connecting device notifies the second connecting device of the read out service type to the second connecting device;

the second connecting device saves the service type notified from the first connecting device;

the second connecting device, when transmitting packets comprising data from the second terminal as a call-in terminal to the IP network after the call is established, sets the saved service type to the packets, thereby, priority control according to the service type set to the packets is performed in the IP network, wherein the second exchange holds a priority class corresponding to the second terminal;

the second connecting device holds a service type corresponding to the priority class held in the second exchange;

the second exchange notifies the second connecting device of the held priority class when a call is set between any one of the first terminals as a call-out terminal and the second terminal as call-in terminal;

the second connecting device reads out a service type corresponding to the priority class notified from the second exchange; and the second connecting device compares the service type notified from the first connecting device and the service type read out from the second connecting device, saves the service type read out from the second connecting device instead of the service type notified from the first connecting device if the service type read out from the second connecting device is higher than the service type notified from the first connecting device.

2. The priority control method according to claim 1, wherein the first exchange, when receiving an indication of a change in the priority class during a communication between the call-out terminal and the call-in terminal, notifies the first connecting device of a new priority class which is equal to or higher than the priority class corresponding to the call-out terminal; and the first connecting device reads out a new service type corresponding to the new priority class notified from the first exchange, saves the read out new service type, and sets the saved new service type to the packets.

3. The priority control method according to claim 2, wherein the first connecting device notifies the second connecting device of the read out new service type, the second connecting device saves the notified new service type notified from the first connecting device, and sets, when transmitting packets comprising data from the second terminal as the call-in terminal to the IP network, the saved new service type to packets.

4. The priority control method according to claim 1, wherein the first connecting device determines a method for compressing and encoding voice data in accordance with the notified priority class; and the first connecting device, when receiving voice data corresponding to voice inputted to the call-out terminal from the first exchange, compresses and encodes the received voice data by using the determined method for compressing and encoding in order to edit packets comprising the voice data.

5. The priority control method according to claim 4 wherein the first connecting device detects, when a congestion relating to a communication between the call-out terminal and the call-in terminal occurs in the IP network, a service type or a priority class corresponding to the communication and changes the method for compressing and encoding based on the detected service type or the detected priority class.

6. The priority control method according to claim 1, wherein the first connecting device, when receiving voice data corresponding to voice inputted to the call-out terminal from the first exchange after the call is established, compresses and encodes the received voice data;

the first connecting device edits packets comprising at least one compressed and encoded voice data;

the first connecting device detects, when a congestion relating to a communication between the call-out terminal and the call-in terminal occurs in the IP network, a service type or a priority class corresponding to the communication; and the first connecting device changes a number of the compressed and encoded voice data comprised in one packet based on the detected service type or the detected priority class.

7. The priority control method according to claim 1, wherein the second connecting device notifies the first connecting device of the priority class notified from the second exchange; and the first connecting device reads out a service type corresponding to the priority class notified from the second connecting device; and the first connecting device compares the saved service type corresponding to the priority class notified from the first exchange and the service type read out from the first connecting device, saves the service type read out from the first connecting device instead of the saved service type if the service type read out from the first connecting device is higher than the saved service type.

8. The priority control method according to claim 1, wherein the first exchange holds priority classes corresponding to an attribute of each of the first terminals;

the first exchange detects, when a call is set between any one of the first terminals as call-out terminal and the second terminal as call-in terminal, an attribute of the first terminal as call-out terminal; and the first exchange notifies the first connecting device of the priority class corresponding to the detected attribute.

9. The priority control method according to claim 1, wherein the first exchange specifies a call-in terminal when a call is set between a call-out terminal and call-in terminal; and the first exchange, when the specified call-in terminal is a predetermined terminal, notifies the first connecting device of a priority class which is equal to or higher than the priority class corresponding to the call-out terminal.

* * * * *